United States Patent [19]

Lamont

[11] 3,714,204
[45] Jan. 30, 1973

[54] PELLETIZED SILICONE RUBBER
[75] Inventor: Peter Lamont, Midland, Mich.
[73] Assignee: Dow Corning Corporation, Midland, Mich.
[22] Filed: May 22, 1970
[21] Appl. No.: 39,915

[52] U.S. Cl. ............260/37 SB, 260/46.5 G, 260/825
[51] Int. Cl. .........................C08g 51/04, C08g 31/02
[58] Field of Search .........260/37 SB, 46.5 U, 46.5 P, 260/46.5 G, 825; 264/140

[56] References Cited

UNITED STATES PATENTS

| | | | |
|---|---|---|---|
| 3,532,649 | 10/1970 | Smith et al. | 260/18 S X |
| 3,188,300 | 6/1965 | Chalk | 260/46.5 U |
| 3,192,181 | 6/1965 | Moore | 260/46.5 U |

FOREIGN PATENTS OR APPLICATIONS

| | | | |
|---|---|---|---|
| 1,567,578 | 5/1959 | France | 260/46.5 |

OTHER PUBLICATIONS

Modern Plastics Encyclopedia & Engineer's Handbook; 1950; pp. 424–427; Sci. Lib., TP 986 A2M5.
Taylor–Stiles Plastic Pelleter; Index No. App. 210, 1955; pp. 1–4.

Primary Examiner—Lewis T. Jacobs
Attorney—Robert F. Fleming, Jr., Laurence R. Hobey, Harry D. Dingman, Howard W. Hermann and Roger H. Borrousch

[57] ABSTRACT

Pellets of a silicone rubber stock containing silicon-bonded vinyl radicals and a platinum catalyst and pellets of a silicone rubber stock containing a silicon compound containing at least three silicon-bonded hydrogen atoms per molecule are present in a mixture sufficient to provide a vulcanizable composition when massed. The vulcanizable composition is useful for extruding on wire and for other silicone rubber products.

43 Claims, No Drawings

PELLETIZED SILICONE RUBBER

This invention relates to a silicone rubber composition in pelletized form.

The cure system involving the addition of silicon-bonded hydrogen atoms to aliphatically unsaturated bonds in the presence of a catalyst has found broad utility in silicone preparations and curing processes. Such processes are described by Speier et al. in U.S. Pat. No. 2,823,218. This system has been used in the preparation of silicone rubbers where silicon-bonded hydrogen atoms add to silicon-bonded vinyl radicals in the presence of a platinum catalyst. The present invention relates to these silicone rubbers. Silicone rubbers of this type have found commercial acceptance in low temperature curing two part room temperature vulcanizing applications. Such compositions are low in viscosity and are suitable in encapsulating electrical components and as potting compounds and sealants. More recently, these compositions have been made into one part curing systems where the platinum catalyst is inhibited at low temperatures but is active upon heating. Such an inhibited system is described by Moore in U.S. Pat. No. 3,192,181 in which benzotriazole inhibits the cure at temperatures up to about 60° C. but cures readily when heated above 60° C.

The physical properties of silicone rubbers cured by the silicon-bonded hydrogen atom addition to silicon-bonded vinyl radicals in the presence of a platinum catalyst can be varied broadly by changing the type and amount of the reactants, such as the silicon compound containing the silicon-bonded hydrogen atoms. Thus, a silicone rubber can be readily tailored for specific uses. These silicone rubbers cure at room temperature, but can be inhibited from doing so. The rate of vulcanization is sensitive to increases in temperature and more so than peroxide catalyst. For these reasons, it is desirable to use this cure system in silicone rubbers which are based on gums.

The use of a cure system, for silicone rubbers based on gums, which cure through the addition of silicon-bonded hydrogen atoms to silicon-bonded vinyl radicals in the presence of a platinum catalyst, as such, is not readily adaptable to wide applications, because the shelf life of such a catalyzed silicone rubber stock is short since curing begins as soon as the catalyst is added and because adding the platinum catalyst just before use requires milling and heating if thorough mixing is to be achieved and heating only accelerates the curing process. These factors have prevented any broad utility of these types of silicone rubbers. The more recent discovery of inhibitors for the platinum catalyst has broadened the scope of utility somewhat. However, inhibitors only inhibit the cure up to 60° C. or 70° C., some inhibitors are volatile and thus, the same convenience as found with peroxide catalyst has not been achieved even with inhibitors, since peroxides are stable or inactive up to temperatures in excess of 100° C. with some as high as 130° C. or 150° C. Substances which inhibit the activity of the platinum catalysts at temperatures above 60° C. or 70° C. do so permanently and are classed as poisons.

Therefore, it is seen that a platinum cure system for silicone rubber gum stocks is desirable, however, the handling problems limit their commercial use. Platinum cure systems also have the advantage of not being inhibited by air which is true with some peroxides. It is therefore an object of the present invention to provide a silicone rubber stock which can be used as peroxide cured stocks but cured with a platinum catalyst. This and other objects will become apparent from the following detailed description of the present invention.

This invention relates to a curable composition in pelletized form consisting essentially of (A) pellets consisting essentially of a silicone rubber stock containing silicon-bonded vinyl radicals and a platinum catalyst and (B) pellets consisting essentially of a silicone rubber stock containing a silicon compound containing at least three silicon-bonded hydrogen atoms per molecule, pellets (A) and pellets (B) present in amounts sufficient to provide a vulcanizable composition when massed.

A silicone rubber stock, for the purposes of the present invention, is any silicone gum with or without fillers and other additives. The silicone rubber stocks of the present invention include everything except a curing catalyst. The silicone rubber stocks in the present invention are also limited to those stocks which contain silicone gums with silicon-bonded vinyl radicals. Such vinyl containing silicone rubber stocks are well known in the art and are available commercially. The vinyl containing silicone rubber stocks suitable for the present invention are those which can be pelletized by any of a number of methods. The suitable silicone rubber stocks which can be pelletized will be apparent to any person skilled in the art of silicone rubber. Those silicone rubber stocks which flow at ambient conditions, naturally, are unsuitable, since such silicone rubber stocks would not remain pellets long and would coagulate and lump together upon storage or shipping and thus any advantages gained by pelleting would be lost. The silicone rubber stocks which do not flow but which are slightly tacky, are suitable for the present invention if they are slightly powered with an inert powder, such as talc. Finely divided or powdered extending fillers can be used to powder these slightly tacky silicone rubber stocks after pelletization. This permits their use and keeps them free flowing. For the purposes of the present invention, pellets are discrete particles which can vary broadly in size from about the size of grains of sand to two or three inch diameter particles. The particles need not be in any regular form, such as spheres.

The curable composition of the present invention which is in pelletized form consists essentially of a mixture of two types of pellets. One type of pellet, (A), consists essentially of a silicone rubber stock which contains silicon-bonded vinyl radicals and a platinum catalyst. The other type of pellet, (B), contains a silicone rubber stock which contains silicon-bonded vinyl radicals and a silicon compound which contains at least three silicon-bonded hydrogen atoms per molecule. The silicone rubber stock of (A) can be the same as the silicone rubber stock of (B) or it can be different, preferably the silicone rubber stocks of (A) and (B) are the same. When the silicone rubber stocks are the same, the final total composition, (A) plus (B), is readily determined and the amount of platinum catalyst and silicon-bonded hydrogen atoms in the total composition can be readily altered by merely changing the ratio of (A) and (B) in the mixture of pellets.

For the most part, the silicone rubber stocks containing the silicon-bonded vinyl radicals consists essentially of a diorganopolysiloxane gum containing silicon-bonded vinyl radicals. The diorganopolysiloxane gums are units of the formula $R_2SiO$ bonded together by silicon-oxygen-silicon bonds in which R is a monovalent hydrocarbon radical or a halogenated monovalent hydrocarbon radical. Preferably, there are at least two vinyl radicals per molecule. The maximum number of vinyl radicals per molecule is not critical, since as the number of vinyl radicals increase the cured product becomes more highly cross-linked or the amount of silicon-bonded hydrogen atoms in pellets (B) can be reduced to provide the cross-linking desired.

R can be any monovalent hydrocarbon radical such as alkyl radicals such as methyl, ethyl, propyl, isopropyl, butyl, pentyl, isopentyl, neopentyl, hexyl, octyl, dodecyl, octadecyl, 3-methylheptyl, 6-butyloctadecyl tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$]-5-nonenyl, spiro-[4.5]decyl, dispiro[4.1.4.2]tridecenyl, decahydronaphthyl, 2,3-dihydroindyl and 1,2,3,4-tetrahydronaphthyl; aryl radicals such as phenyl, tolyl, xylyl, 3-ethylphenyl, xenyl, naphthyl, anthracyl, pentacenyl, 3,4-methylethylphenyl, 9,9′-bifluoryl and 4-m-terphenyl; and aralkyl radicals such as 2-phenyl-octyl, 3-methyl-2-(4-isopropylphenyl)heptyl, benzyl, 2-ethyl-tolyl, 2-ethyl-p-cymyl, diphenylmethyl, 4,5-diphenylpentyl, 2-phenylethyl and 2-phenylpropyl.

R can be any monovalent halogenated hydrocarbon group such as aliphatic groups such as chloromethyl, 3-chloropropyl, 3,3,3-trichloropropyl, perfluorovinyl, chlorooctadecyl or radicals of the formula $R_fCH_2CH_2$- where $R_f$ can be any perfluoroalkyl group such as trifluoromethyl, perfluoroethyl, perfluoroisobutyl, perfluoro-heptyl or perfluorooctadecyl; aromatic groups such as dichlorophenyl, tetrabromoxenyl, tetrachlorophenyl, alpha,alpha,alpha,-trifluorotolyl or iodonaphthyl; cycloaliphatic groups such as chlorocyclohexyl, bromocyclopentyl or chlorocyclohexenyl and aralkyl groups such as chlorobenzyl, beta-(chlorophenyl)ethyl or beta-(iodophenyl)ethyl or beta-(bromophenyl)propyl.

Preferably, R is methyl and vinyl radicals. The diorganopolysiloxane gums can be endblocked with silicon-bonded hydroxyl radicals or triorganosiloxy radicals where the organic groups are the same as for R.

The silicone rubber stocks can also contain fillers. The fillers are those conventionally used in silicone rubber. The fillers can be either reinforcing fillers such as fume silica or non-reinforcing fillers. The silica fillers can be treated or untreated to make them hydrophobic. Treated fillers are well known in the art and include treatment with chlorosilanes, such as triorganochlorosilanes and diorganodichlorosilane, diorganocyclosiloxanes, hexaorganodisiloxane, organosilazanes and the like. Examples of suitable fillers include, fume silica, silica aerogel, silica xerogel, silica soot, carbon black, quartz, diatomaceous earth, metal carbonates such as calcium carbonate, metal oxides, such as alumina, metal silicates such as zirconium silicate, clays, talc and the like. The silicone rubber stocks preferably contain fillers, particularly, silica fillers to reinforce the rubber and provide increased tensile and tear properties. The use of fillers also provide a wider range of diorganopolysiloxane gums which can be used, such as those of lower plasticity.

The silicone rubber stocks can also contain other ingredients conventionally used in silicone rubber, such as pigments to impart color, compression set additives, plasticizers, heat stability additives and the like.

The platinum catalysts are well known and any of the platinum catalysts which are readily dispersible in the silicone rubber stock are suitable for the present invention, such as platinic chlorides, salts of platinum, platinum complexes and chloroplatinic acid. The platinum catalyst can be illustrated by, $PtCl_2[P(CH_2CH_2CH_3)B\&3]_2$, platinum bromides, a complex platinous halide and an olefin such as ethylene, $Pt(CH_3CN)_2Cl_2$, $[Pt(CH_3CN)_2(CH_3)_4]Cl_2$, $Pt(NH_3)_2Cl_2$, $K[PtCl_3CH_2CH_2CH_2OH]$, $PtBr_2(C_2H_4)_2$, $K[PtBr_3(C_2H_4)]$, $PtCl_2(C_2H_4)$, $(CH_3)_2C=CH_2 \cdot PtCl_2$, $H_2Pt(CN)_4 \cdot 5H_2O$, $H[PtCl_3(CH_3CN)]$, $Pt(NH_3)_2(CNS)_2$, $PtCl_2 \cdot PCl_3$, $[Pt(NH_3)_4] \cdot [PtCl_4]$, $PtCl_2]P(CH_2CH_3)_3]_2$, $PtCl_2 \cdot P(OH)_3$, $PtCl_2 \cdot P(OCH_2CH_3)_3$, $PtCl_2 \cdot ]P(OCH_2CH_3)_3]_2$, $Pt(OOCCH_2SCH_2CH_3)_2$, $Pt(CN)_3$, $(CH_3)_4Pt$, $$(CH_3)_3Pt\text{—}Pt(CH_3)_3, \quad (CH_3)_3Pt(CH_3COCH\overset{-O}{=}CCH_3),$$

$$PtCl_2CO \text{ and } PtBr_2CO$$

The platinum catalysts can also have present inhibitors such as the benzotriazole mentioned above, a stannous salt, a mercuric salt, a bismuth salt, a cuprous salt, a cupric salt, an acetylenic unsaturated compound such as 2-ethynylisopropanol and the like. The inhibitors, however, are not essential to the present invention.

The silicon compound containing at least three silicon-bonded hydrogen atoms can be any of those well known silicon compounds which contain at least three silicon-bonded hydrogen atoms. These silicon compounds, for the most part, contain silicon-bonded organic groups as defined for R above and are free of aliphatic unsaturation. The silicon compounds can be illustrated by compounds composed of one or more of the units $HSiO_{1.5}$, $RHSiO$, $R_2HSiO_{0.5}$, and $SiO_2$, where R is defined above, preferably R is methyl, phenyl or 3,3,3-trifluoropropyl. Illustrative of the silicon compounds containing at least three silicon-bonded hydrogen atoms are $HSi[OSi(CH_3)_2H]_2OSi(CH_3)_3$, $[(CH_3)HSiO]_3$, $(CH_3)_3SiO](CH_3)HSiO]_{10}Si(CH_3)_3$, $[(CH_3)HSiO]_4$, $Si[OSi(CH_3)_2H]_4$, copolymers of $SiO_2$ and $H(CH_3)_2SiO_{0.5}$, copolymers of $SiO_2$, $(CH_3)_2SiO$ and $H(CH_3)_2SiO_{0.5}$, copolymers of $(CH_3)_3SiO_{0.5}$, $H(CH_3)_2SiO_{0.5}$ and $(CH_3)_2SiO$, copolymers of $(CH_3)HSiO$ and $(C_6H_5)(CH_3)SiO$, copolymers of $(CH_3)HSiO$, $(CH_3)_2SiO$ and $(C_6H_5)_2SiO$, copolymers of $(CH_3)HSiO$ and $(CH_3)_2SiO$, $C_6H_5Si[OSi(C_6H_5)(CH_3)H]_3$,

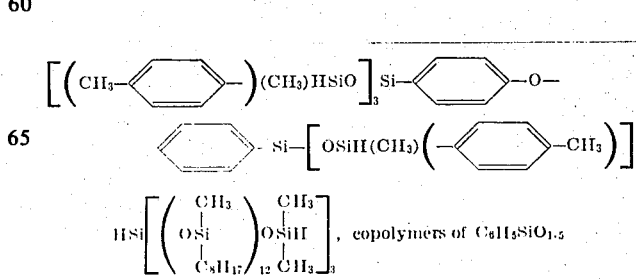

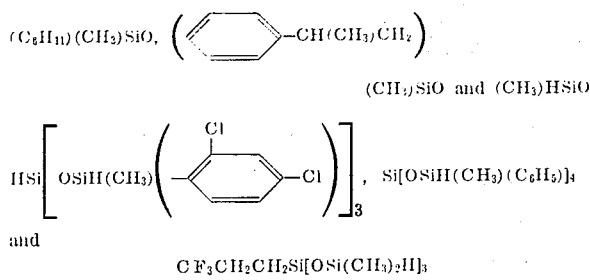

and $CF_3CH_2CH_2Si[OSi(CH_3)_2H]_3$

The diorganopolysiloxane gums should have a plasticity of at least 0.050 inch. Diorganopolysiloxanes which have plasticities between 0.050 inch to about 0.070 inch require filler present to provide a silicone rubber stock which does not flow and which can be pelletized. The silicone rubber stocks preferably contain a filler when the diorganopolysiloxane gum has a plasticity between 0.050 and 0.100 inch. As a rule of thumb, the higher the plasticity the less filler is required to provide a pelletizable silicone rubber stock. However, filler need not be excluded, regardless of the plasticity, since filler, particularly the reinforcing fillers, are advantageously used to enhance the physical properties. The silicone rubber stocks which are readily pelletized have a plasticity of at least 0.100 inch. The plasticity is determined by ASTM-D-926-56 test procedure.

The pellets (A) and pellets (B) are mixed in the proper proportions to give a vulcanizable product. To give reasonable rubber properties there should be at least 1.0 silicon-bonded hydrogen atom per vinyl radical. The upper limit is not narrowly critical but should not exceed one silicon-bonded hydrogen-bearing silicon compound molecule per vinyl radical. If one exceeds one silicon-bonded hydrogen-bearing silicon compound molecule per vinyl radical, the silicone rubber stock will not vulcanize.

Silicone rubber stocks which are most suitable for purposes of the present invention are those which contain from 10 to 100 inclusive parts by weight of a reinforcing silica filler per 100 parts by weight of the diorganopolysiloxane gum and the platinum catalyst is present in an amount sufficient to provide from 10 to 150 parts by weight platinum per one million parts by weight of diorganopolysiloxane gum. When non-reinforcing fillers are used the total amount of filler, both reinforcing and non-reinforcing, can be up to 300 parts by weight per 100 parts by weight diorganopolysiloxane gum. Preferably, the amount of reinforcing silica filler is from 30 to 60 parts by weight per 100 parts by weight of diorganopolysiloxane gum.

The silicone rubber stock, both for (A) and (B), can be pelletized by a number of methods. The silicone rubber stocks can be pelletized by commercial pelletizers or granulators. They also can be pelletized, especially for the small size pellets, by spray drying, such as by dispersing the silicone rubber stock in an organic solvent and spraying into a heated atmosphere such that the solvent is rapidly vaporized leaving discrete pellets behind. Commercial spray dryers are suitable for this technique. The silicone rubber stocks can also be pelletized by extruding the stock through an orifice and chopping the extruded stock to suitable sizes. One can also sheet and chop to produce the pellets. If the particular silicone rubber stock is slightly tacky, the pellets should be powdered immediately with talc or some substitute to avoid any coagulating or lumping.

The pelletized compositions of the present invention are particularly useful in extrusion applications because of their easy handling. The present pelletized composition is a two component system, having all the stability of two component systems, but usable as a one component system, since the two components can be stored and shipped in one package. The pelletized composition can be extruded without first milling it. The one package, two component composition is stable until it is massed, by extruding, by milling or other massing means. The pelletized composition eliminates steps in processes using silicone rubber, such as the fabricating of silicone rubber parts, the extrusion of silicone rubber on wire and the like. The pelletized composition could be poured directly from a storage container into a hopper feed extruder without the time consuming milling operation. The pelletized composition can be extruded on fabric, can be molded and used in any other way silicone rubber gum stocks can be used with improved handling, however.

The following examples are for illustrative purposes only and should not be construed as limiting the present invention which is properly delineated in the claims.

EXAMPLE 1

A mixture of 100 parts by weight of a diorganopolysiloxane gum having 99.858 mol per cent dimethylsiloxane units and 0.142 mol per cent methylvinylsiloxane units, endblocked with dimethylvinylsiloxane units and having a plasticity of 0.060 inch, 55 parts by weight of a reinforcing silica filler, 7 parts by weight of a hydroxyl endblocked polydimethylsiloxane fluid having a viscosity of 2 cs. at 25° C., 5 parts by weight of diphenylsilanediol and 1 part by weight of a hydroxyl end-blocked polymethylvinylsiloxane fluid having 4 weight per cent hydroxyl radicals, was mixed and heated for 3 hours at 170° to 180° C. under vacuum. This mixture was divided and two mixtures were prepared by milling. Mixture (A) was 100 parts by weight of the above gum mixture, $79 \times 10^{-5}$ parts by weight platinum added as a 0.19 weight per cent chloroplatinic acid solution in butyl carbitol acetate and 0.36 part by weight of methylbutynol. Mixture (B) was 100 parts by weight of the above gum mixture, 1.8 parts of a heat stability additive and 3.0 parts by weight of a benzene soluble copolymer having dimethylhydrogensiloxane units and $SiO_2$ units in a mole ratio of 2 to 3.36 respectively. Mixture (A) and mixture (B) were separately extruded through an orifice having four one-quarter inch diameter openings and as the extruded mixture immerges from the openings a blade cut the extrusions in approximately one-quarter inch lengths. The pellets were allowed to fall into a talc powder. The pellets were then separated from the excess talc powder by screening. The pellets of mixture (A) were mixed with pellets of mixture (B) in equal weight. A part of the mixed pellet composition was massed by milling and then press molded for 10 minutes at 171° C. The molded article had a durometer on the Shore A scale of 72, a tensile strength at break of 1,225 p.s.i. and an elongation of 380 per cent. Another part of the mixed pellet composition was extruded on wire and hot air vulcanized to give silicone rubber with a tensile strength at break of 1,171 p.s.i. and an elongation at break of 380 per cent.

EXAMPLE 2

A mixture, (A), was prepared by milling together 100 parts by weight of the diorganopolysiloxane gum described in Example 1, 55 parts by weight of a reinforcing silica filler, 8.5 parts by weight of 5 micron quartz, 7 parts by weight of a hydroxyl endblocked polydimethylsiloxane fluid having a viscosity of 2 cs. at 25°C., 5 parts by weight of diphenylsilanediol, 1 part by weight of a hydroxyl endblocked polymethylvinylsiloxane fluid having 4 weight percent hydroxyl radicals, 1.5 parts by weight of a heat stability additive and 1 part by weight of a chloroplatinic acid catalyst having 0.22 weight per cent platinum.

A mixture, (B), was prepared by milling silicone rubber stock as described above except in place of the platinum catalyst, 1.5 parts by weight of a trimethylsiloxane endblocked polymethylhydrogensiloxane fluid having an average of about 30 siloxane units per molecule was added.

Mixtures (A) and (B) were separately put into a chlorothene dispersion to obtain about 11.7 weight per cent solids. The chlorothene dispersion was then sprayed through a nozzle into a heated air atmosphere at about 150° to 175°C. and a pressure of about 100 p.s.i. The spray dried pellets of silicone rubber stock were about 80 to 100 microns across. Pellets of mixture (A) were mixed with pellets of mixture (B) in equal weights and stored for 7 months. The stored pellets remained separated and were readily massed by milling for 1 minute. The massed pellets were then milled for 4 minutes more. The milled mixture was press molded for 10 minutes at 149° C. The vulcanized silicone rubber had a durometer of 42 on the Shore A scale, a tensile strength at break of 80 p.s.i., an elongation at break of 580 per cent and a tear strength, die B of 28 p.s.i.

That which is claimed is:

1. A curable composition in pelletized form consisting essentially of the admixture of
   (A) pellets consisting essentially of a silicone rubber stock containing silicon-bonded vinyl radicals and a platinum catalyst and
   (B) pellets consisting essentially of a silicone rubber stock containing a silicon compound containing at least three silicon-bonded hydrogen atoms per molecule, pellets (A) and pellets (B) present in amounts sufficient to provide a vulcanizable composition when massed.

2. The curable composition in pelletized form in accordance with claim 1 in which the silicone rubber stock of pellets (A) consists essentially of a diorganopolysiloxane gum having a unit formula $R_2SiO$ in which R is a monovalent radical selected from the group consisting of a hydrocarbon radical and a halogenated hydrocarbon radical, said units being bonded together by silicon-oxygen-silicon bonds, there being at least two vinyl radicals per molecule and said diorganopolysiloxane gum being endblocked with radicals selected from the group consisting of a hydroxyl radical and triorganosiloxy radicals where the organic radicals are R radicals and a filler, and the silicone rubber stock of pellets (B) consists essentially of a diorganopolysiloxane gum as described for pellets (A) and a filler.

3. The curable composition in pelletized form in accordance with claim 2 in which R radicals other than vinyl are methyl.

4. The curable composition in pelletized form in accordance with claim 2 in which R radicals other than vinyl are methyl radicals and phenyl radicals and not more than 50 percent of the R radicals being phenyl radicals.

5. The curable composition in pelletized form in accordance with claim 2 in which the plasticity of the diorganopolysiloxane gum is at least 0.050 inch.

6. The curable composition in pelletized form in accordance with claim 3 in which the plasticity of the diorganopolysiloxane gum is at least 0.050 inch.

7. The curable composition in pelletized form in accordance with claim 4 in which the plasticity of the diorganopolysiloxane gum is at least 0.050 inch.

8. The curable composition in pelletized form in accordance with claim 1 in which the silicon compound containing at least three silicon-bonded hydrogen atoms per molecule having in addition an average of up to two monovalent organic radicals per silicon atom selected from the group consisting of monovalent hydrocarbon radicals free of aliphatic unsaturation and monovalent halogenated hydrocarbon radicals free of aliphatic unsaturation, the remaining valences of the silicon atoms being satisfied by divalent oxygen atoms linking the silicon atoms together.

9. The curable composition in pelletized form in accordance with claim 2 in which the silicon compound containing at least three silicon-bonded hydrogen atoms per molecule having in addition an average of up to two monovalent organic radicals per silicon atom selected from the group consisting of monovalent hydrocarbon radicals free of aliphatic unsaturation and monovalent halogenated hydrocarbon radicals free of aliphatic unsaturation, the remaining valences of the silicon atoms being satisfied by divalent oxygen atoms linking the silicon atoms together.

10. The curable composition in pelletized form in accordance with claim 9 in which the R radicals and the organic radicals other than vinyl are methyl.

11. The curable composition in pelletized form in accordance with claim 9 in which the R radicals and the organic radicals other than vinyl are methyl radicals and phenyl radicals and not more than 50 percent of the R radicals being phenyl radicals.

12. The curable composition in pelletized form in accordance with claim 9 in which the plasticity of the diorganopolysiloxane gum is at least 0.050 inch.

13. The curable composition in pelletized form in accordance with claim 10 in which the plasticity of the diorganopolysiloxane gum is at least 0.050 inch.

14. The curable composition in pelletized form in accordance with claim 11 in which the plasticity of the diorganopolysiloxane gum is at least 0.050 inch.

15. The curable composition in accordance with claim 1 in which the ratio of silicon-bonded hydrogen atoms per silicon-bonded vinyl radicals is at least 1.0 and up to one silicon-bonded hydrogen bearing silicon compound molecule per vinyl radical.

16. The curable composition in pelletized form in accordance with claim 5 in which the ratio of silicon-bonded hydrogen atoms per silicon-bonded vinyl radicals is at least 1.0 and up to one silicon-bonded hydrogen bearing silicon compound molecule per vinyl radical.

17. The curable composition in pelletized form in accordance with claim 13 in which the ratio of silicon-bonded hydrogen atoms per silicon-bonded vinyl radicals is at least 1.0 and up to one silicon-bonded hydrogen bearing silicon compound molecule per vinyl radical.

18. The curable composition in pelletized form in accordance with claim 1 in which each pellet has a plasticity of at least 0.100 inch.

19. The curable composition in pelletized form in accordance with claim 2 in which each pellet has a plasticity of at least 0.100 inch.

20. The curable composition in pelletized form in accordance with claim 12 in which each pellet has a plasticity of at least 0.100 inch.

21. The curable composition in pelletized form in accordance with claim 17 in which each pellet has a plasticity of at least 0.100 inch.

22. The curable composition in pelletized form in accordance with claim 2 in which the filler in the total composition is a reinforcing silica filler present in an amount from 10 to 100 inclusive parts by weight per 100 parts by weight of the diorganopolysiloxane gum and the platinum catalyst in the total composition is present in an amount to provide from 10 to 150 inclusive parts by weight platinum per one million parts by weight of the diorganopolysiloxane gum.

23. The curable composition in pelletized form in accordance with claim 6 in which the filler in the total composition is a reinforcing silica filler present in an amount from 10 to 100 inclusive parts by weight per 100 parts by weight of the diorganopolysiloxane gum and the platinum catalyst in the total composition is present in an amount to provide from 10 to 150 inclusive parts by weight platinum per one million parts by weight of the diorganopolysiloxane gum.

24. The curable composition in pelletized form in accordance with claim 7 in which the filler in the total composition is a reinforcing silica filler present in an amount from 10 to 100 inclusive parts by weight per 100 parts by weight of the diorganopolysiloxane gum and the platinum catalyst in the total composition is present in an amount to provide from 10 to 150 inclusive parts by weight platinum per one million parts by weight of the diorganopolysiloxane gum.

25. The curable composition in pelletized form in accordance with claim 16 in which the filler in the total composition is a reinforcing silica filler present in an amount from 10 to 100 inclusive parts by weight per 100 parts by weight of the diorganopolysiloxane gum and the platinum catalyst in the total composition is present in an amount to provide from 10 to 150 inclusive parts by weight platinum per one million parts by weight of the diorganopolysiloxane gum.

26. The curable composition in pelletized form in accordance with claim 21 in which the filler in the total composition is a reinforcing silica filler present in an amount from 10 to 100 inclusive parts by weight per 100 parts by weight of the diorganopolysiloxane gum and the platinum catalyst in the total composition is present in an amount to provide from 10 to 150 inclusive parts by weight platinum per one million parts by weight of the diorganopolysiloxane gum.

27. The curable composition in pelletized form in accordance with claim 22 in which an extending filler is also present to provide up to 300 parts by weight total filler per 100 parts by weight of diorganopolysiloxane gum in the total composition.

28. The curable composition in pelletized form in accordance with claim 23 in which an extending filler is also present to provide up to 300 parts by weight total filler per 100 parts by weight of diorganopolysiloxane gum in the total composition.

29. The curable composition in pelletized form in accordance with claim 24 in which an extending filler is also present to provide up to 300 parts by weight total filler per 100 parts by weight of diorganopolysiloxane gum in the total composition.

30. The curable composition in pelletized form in accordance with claim 25 in which an extending filler is also present to provide up to 300 parts by weight total filler per 100 parts by weight of diorganopolysiloxane gum in the total composition.

31. The curable composition in pelletized form in accordance with claim 26 in which an extending filler is also present to provide up to 300 parts by weight total filler per 100 parts by weight of diorganosiloxane gum in the total composition.

32. The curable composition in pelletized form in accordance with claim 26 in which the reinforcing silica filler is present in an amount of from 30 to 60 inclusive parts by weight per 100 parts by weight of the diorganopolysiloxane gum.

33. The curable composition in pelletized form in accordance with claim 1 in which the silicone rubber stock of pellets (A) and pellets (B) are the same.

34. The curable composition in pelletized form in accordance with claim 2 in which the silicone rubber stock of pellets (A) and pellets (B) are the same.

35. The curable composition in pelletized form in accordance with claim 6 in which the silicone rubber stock of pellets (A) and pellets (B) are the same.

36. The curable composition in pelletized form in accordance with claim 21 in which the silicone rubber stock of pellets (A) and pellets (B) are the same.

37. The curable composition in pelletized form in accordance with claim 26 in which the silicone rubber stock of pellets (A) and pellets (B) are the same.

38. The curable composition in pelletized form in accordance with claim 31 in which the silicone rubber stock of pellets (A) and pellets (B) are the same.

39. The curable composition in pelletized form in accordance with claim 2 in which a plasticizer is also present.

40. The curable composition in pelletized form in accordance with claim 21 in which a plasticizer is also present.

41. The curable composition in pelletized form in accordance with claim 37 in which a plasticizer is also present.

42. A method comprising (I) pelletizing a silicone rubber stock containing silicon-bonded vinyl radicals and a platinum catalyst, (II) pelletizing a silicone rubber stock containing a silicon compound containing at least three silicon-bonded hydrogen atoms per molecule, (III) mixing the pellets produced in (I) and the pellets produced in (II) in amounts sufficient to provide a vulcanizable composition when massed.

43. A curable composition in pelletized form consisting essentially of the admixture of A. pellets consisting essentially of (1) a vinyl radical containing polydiorganosiloxane, the remaining organic radicals being selected from monovalent hydrocarbon radicals and monovalent halohydrocarbon radicals, and (2) a platinum catalyst, and B. pellets consisting essentially of an organosiloxane having at least three silicon-bonded hydrogen atoms per molecule and in which the organic radicals are selected from monovalent hydrocarbon radicals and monovalent halogenated hydrocarbon radicals, pellets (A) and pellets (B) present in amounts sufficient to provide a vulcanizable composition.

* * * * *